(12) United States Patent
Shin et al.

(10) Patent No.: US 9,166,988 B1
(45) Date of Patent: Oct. 20, 2015

(54) SYSTEM AND METHOD FOR CONTROLLING VIRTUAL NETWORK INCLUDING SECURITY FUNCTION

(71) Applicant: KOREA INTERNET & SECURITY AGENCY, Seoul (KR)

(72) Inventors: Youngsang Shin, Seoul (KR); Seulgi Lee, Jeonju-si (KR); Tongwook Hwang, Seoul (KR); Haeryong Park, Incheon (KR)

(73) Assignee: KOREA INTERNET & SECURITY AGENCY (KR)

( * ) Notice: Subject to any disclaimer, the term of this patent is extended or adjusted under 35 U.S.C. 154(b) by 0 days.

(21) Appl. No.: 14/263,035

(22) Filed: Apr. 28, 2014

(30) Foreign Application Priority Data

Apr. 22, 2014 (KR) ........................ 10-2014-0047994

(51) Int. Cl.
*G06F 11/00* (2006.01)
*H04L 29/06* (2006.01)

(52) U.S. Cl.
CPC ................ *H04L 63/14* (2013.01); *H04L 63/20* (2013.01)

(58) Field of Classification Search
CPC ..... H04L 63/02; H04L 63/0227; H04L 63/20; G06F 21/50
USPC .................. 726/22–23, 11; 370/235; 709/225
See application file for complete search history.

(56) References Cited

U.S. PATENT DOCUMENTS

| | | | |
|---|---|---|---|
| 7,805,752 B2 * | 9/2010 | Newstadt et al. ................. 726/1 |
| 7,904,950 B2 * | 3/2011 | Yeom .............................. 726/11 |
| 8,224,761 B1 * | 7/2012 | Rockwood .......... H04L 63/0263 |
| | | | 706/47 |
| 8,443,440 B2 * | 5/2013 | McGee ........................... 726/22 |
| 8,750,123 B1 * | 6/2014 | Alisawi ......................... 370/235 |
| 8,839,404 B2 * | 9/2014 | Li et al. .......................... 726/12 |
| 8,850,588 B2 * | 9/2014 | Kumar et al. ................... 726/25 |
| 8,910,268 B2 * | 12/2014 | Hudis .............. G06F 17/30867 |
| | | | 726/1 |
| 8,910,278 B2 * | 12/2014 | Davne ................ H04L 63/0272 |
| | | | 705/2 |
| 8,935,742 B2 * | 1/2015 | Nice ................. G06F 17/30867 |
| | | | 726/1 |
| 8,977,750 B2 * | 3/2015 | Ferris ........................... 709/225 |
| 9,069,599 B2 * | 6/2015 | Martinez ................. G06F 9/455 |
| | | | 1/1 |
| 2011/0004935 A1 * | 1/2011 | Moffie et al. ................... 726/23 |
| 2012/0297483 A1 * | 11/2012 | Boot et al. ...................... 726/23 |
| 2012/0304244 A1 * | 11/2012 | Xie et al. .......................... 726/1 |
| 2013/0117849 A1 * | 5/2013 | Golshan et al. ................. 726/23 |
| 2013/0305311 A1 * | 11/2013 | Puttaswamy Naga ...................... H04L 63/20 |
| | | | 726/1 |
| 2013/0347110 A1 * | 12/2013 | Dalal ............................. 726/23 |
| 2014/0237594 A1 * | 8/2014 | Thakadu ................. G06F 21/52 |
| | | | 726/23 |

OTHER PUBLICATIONS

Q Zhang, Cloud Computing: state of the art and research challenges, vol. 1, May 2010, pp. 7-18.*

* cited by examiner

*Primary Examiner* — Dede Zecher
*Assistant Examiner* — Viral Lakhia
(74) *Attorney, Agent, or Firm* — Cantor Colburn LLP

(57) ABSTRACT

Disclosed therein are system and method for controlling a virtual network with a security function which can manage security states of virtual machines in a cloud datacenter, analyze security states of malicious virtual machines, and isolate and treat the malicious virtual machines in order to cope with intrusion of a virtual network under a cloud computing environment. The virtual network controlling system and method reduce the number of packets to which the IPS carries out a signature matching inspection through a DPI test by diffusing blocking against the previously detected intruder by the network level, so as to enhance performance of the virtualized network IPS.

3 Claims, 6 Drawing Sheets

SYSTEM AND METHOD FOR CONTROLLING VIRTUAL NETWORK INCLUDING SECURITY FUNCTION

BACKGROUND OF THE INVENTION

1. Field of the Invention

The present invention relates to a virtual network controlling system, and more particularly, to a virtual network controlling system including security function.

2. Background Art

Recently, an SDDC (Software-Defined DataCenter) attracts attention in the cloud computing environment, and enhances management efficiency and utilization rate of a cloud datacenter through virtualization of the whole resources including servers and networks. Particularly, in order to reduce the bottleneck of the cloud datacenter and efficiently construct and utilize the networks, a network virtualization through application of SDN (Software-Defined Network) is in progress.

The cloud environment can minimize IT resource expenses by increasing the utilization rate and easiness in management of IT resources through application of the virtualization. The server virtualization in the cloud environment was previously in a stable stage, but the network virtualization is not yet steady. Recently, in order to improve the network virtualization, efforts to reduce the bottleneck in the cloud infrastructure by applying the SDN technology to the network virtualization are actively underway.

In general, virtualization refers to the act of creating and running a plurality of operating systems in one system by dividing a single physical hardware into a plurality of virtual hardware devices. Such software capable of virtualization is a hypervisor. The hypervisor is to provide how to access different operating systems from one physical computer resource, such as a processor or a memory existing in one host, namely, is a piece of computer software that makes one computer run a number of operating systems.

Recently, with the appearance of high-performance CPUs, multi core CPUs, and high-capacity memories, it became possible to construct various virtual machines in one host and install and run a plurality of operating systems in each of the virtual machines in an allowable range of a memory.

A conventional physical server, for instance, a host, generally leases one host to just one subscriber, but when the virtualization technology is applied, one virtualized system can run various subscriber services, for instance, file servers, mail servers, web servers, and so on, so as to lease one physical server, for instance, one host, to several subscribers.

However, such a physical server to which the virtualization technology is applied has several problems, such as attack and hacking into each of the virtual machines of the subscribers and information spill from the virtual machine, because many operating systems to the number of logical servers to be installed must be installed in one host. Additionally, the virtualized system in the cloud environment which is composed of hundreds of or thousands of virtual machines is difficult to establish and apply security policies to every virtual machine. In the cloud environment, when one virtual machine is infected, other virtual machines in the system are also infected, and finally, the entire cloud systems are infected.

Conventionally, a hardware-based network security system, for instance, an IPS (Intrusion Prevention System), is an independent device which is physically installed on the outside and is very expensive.

Moreover, if the conventional hardware-based network security system, for instance, the IPS, is installed in the virtualized system of the cloud environment which softwarely distributes and allocates resources through virtualization of the entire resources including servers and networks, it is difficult to construct a security system which ideally comes into contact with the system structure, and cannot be effectively connected with the virtualized system of the cloud environment which has to frequently carry out variable distribution and allocation of resources in order to diffuse a system load.

SUMMARY OF THE INVENTION

Accordingly, an important aspect of the present invention is that the present inventors recognized certain drawbacks of the related art, as mentioned above. As a result, the present inventors provided a solution to such drawbacks, as follows.

It is an object of the present invention to provide system and method for controlling a virtual network with a security function, which can actively blocks malicious traffics or harmful packets in advance and switch normal packets to a destination in the network level inside a virtualized system.

To accomplish the above object, according to the present invention, there is provided a method for controlling a virtual network with a security function including the steps of: method for controlling a virtual network with a security function comprising the steps of: creating real time blocking rules by a vIPS (virtual Intrusion Prevention System) when any malicious behavior is detected according to a signature-based detection; sending the real time blocking rules to a vSwitch (virtual Switch) and blocking an attacking traffic by the vSwitch according to the sent blocking rules; checking whether or traffic blocking was actually carried out during a designated period of time (hereinafter, called 'blocking time') when the blocking time is lapsed according to the blocking rules; deleting the created blocking rules and terminating the corresponding traffic blocking by the vIPS if the traffic blocking was not carried out actually during the blocking time; and extending the blocking time based on the present state to which the blocking rules were applied and terminating blocking of the corresponding traffic by the vIPS if the traffic blocking was carried out actually during the blocking time.

In another aspect of the present invention, there is provided a method for controlling a virtual network with a security function including the steps of: receiving an attack detection-related security alert (common event format) from vIPSs in a virtual network controlling system including a cloud ESM (Enterprise Security Management) system; analyzing a traffic or an attack pattern detected in the vIPS through a correlation analysis by the cloud ESM system when the attack detection-related event format is received; determining a real time blocking reaction against the detected traffic or attack in the cloud ESM system on the basis of the analyzed results and sending the blocking reaction command to the vIPS; creating real time blocking rules by the vIPS according to the blocking reaction command; sending the real time blocking rules to the vSwitch and blocking the attacking traffic by the vSwitch according to the received blocking rules; checking whether or traffic blocking was actually carried out during a blocking time when the blocking time is lapsed according to the blocking rules; deleting the created blocking rules and terminating the corresponding traffic blocking by the vIPS if the traffic blocking was not carried out actually during the blocking time; and extending the blocking time based on the present state to which the blocking rules were applied and terminating blocking of the corresponding traffic by the vIPS if the traffic blocking was carried out actually during the blocking time.

Preferably, the cloud ESM system includes: a cloud collection information management module which stores and manages virtualization resource information and security events collected in the vIPS; a cloud security event analysis and security state monitoring module which carries out attack correlation analysis in reference to information received from the vIPS; and a cloud security control management module which forcedly migrates the malicious virtual machine in a logical/physical manner, recognizes a change in information of the virtual machine, and sends a security control command according to a policy change to the vIPS through a cloud agent.

Preferably, the vIPS includes: an intrusion response processing module which request creation of the real time blocking rules according to the blocking reaction command; a policy and signature management module which manages creation, update and deletion of the real time blocking rules; an external interface module which provides an interface to send and receive policies of the real time blocking rules; and a hypervisor security API module which sets up or deletes the blocking rules on the vSwitch.

Preferably, the vIPS sends the created real time blocking rules to an SDN controller so as to expand security of the virtual network system to an SDN network.

Additional features and advantages of the present invention will be shown in the following description, will be apparent by the following description, and will be known well through practice of the present invention. The above and other objects and merits of the present invention will be apparent from the following detailed description of the preferred embodiments of the invention in conjunction with the accompanying drawings.

BRIEF DESCRIPTION OF THE DRAWINGS

The above and other objects, features and advantages of the present invention will be apparent from the following detailed description of the preferred embodiment of the present invention in conjunction with the accompanying drawings, in which.

DETAILED DESCRIPTION OF THE PREFERRED EMBODIMENT

Reference will be now made in detail to the preferred embodiments of the present invention with reference to the attached drawings.

In order to cope with intrusion into a virtual network under a cloud computing environment, a virtual network controlling system with a security function which manages security states of virtual machines in a cloud datacenter, analyzes security states of malicious virtual machines and isolates and treats the malicious virtual machines.

In order to cope with virtualized attacks inside the cloud system which the conventional security equipment cannot detect, such as hacking between virtual machines (VMs) and hypervisor rootkit, the virtual network controlling system with the security function according to the preferred embodiment of the present invention needs detection and action of real time attacks of virtualized networks/hosts, collection of cloud resource information and security events, monitoring and analysis of cloud security states, application of cloud security policies, and so on.

A software-based vIPS (virtual Intrusion Prevention System) constructed on the virtualized network has difficulty in providing high performance compared with a hardware-based IPS.

Moreover, a software-based virtual security appliance has a limitation in hardware resources which are allocated to improve performance of the IPS because sharing the same hardware with the virtual machines which provide actual services. That is, if lots of hardware resources are allocated to the IPS, the virtual machines which provide actual services are deteriorated in performance.

The performance of signature-based IPSs are mainly affected by two elements, namely, the number of attacks to be detected (for instance, the number of signatures) and the number of network packets to be processed.

If the number of attack detection signatures is reduced, it is ineffective because kinds of detectable attacks are reduced. Therefore, instead of reducing the number of the attack detection signatures, it is more effective to reduce the number of network packets to be processed.

Therefore, the virtual network controlling system according to the preferred embodiment of the present invention reduced the number of packets to which the IPS performs signature matching inspection through a DPI test by diffusing blocking against a previously detected intruder by the network level.

Figure 1:
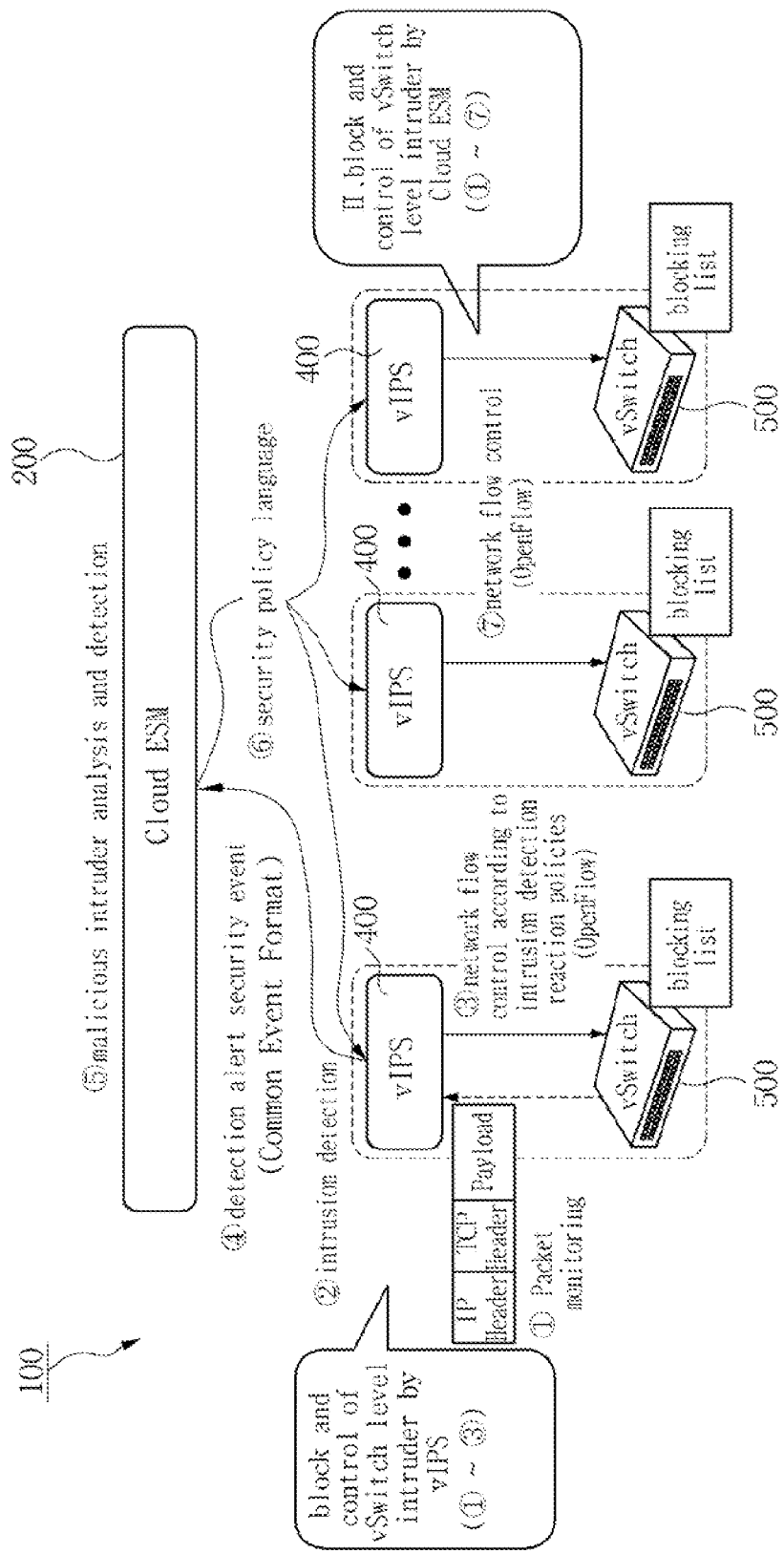
FIG. 1 is a conceptual diagram showing an operation of a system for controlling a virtual network with a security function according to a preferred embodiment of the present invention.
Figure 2:
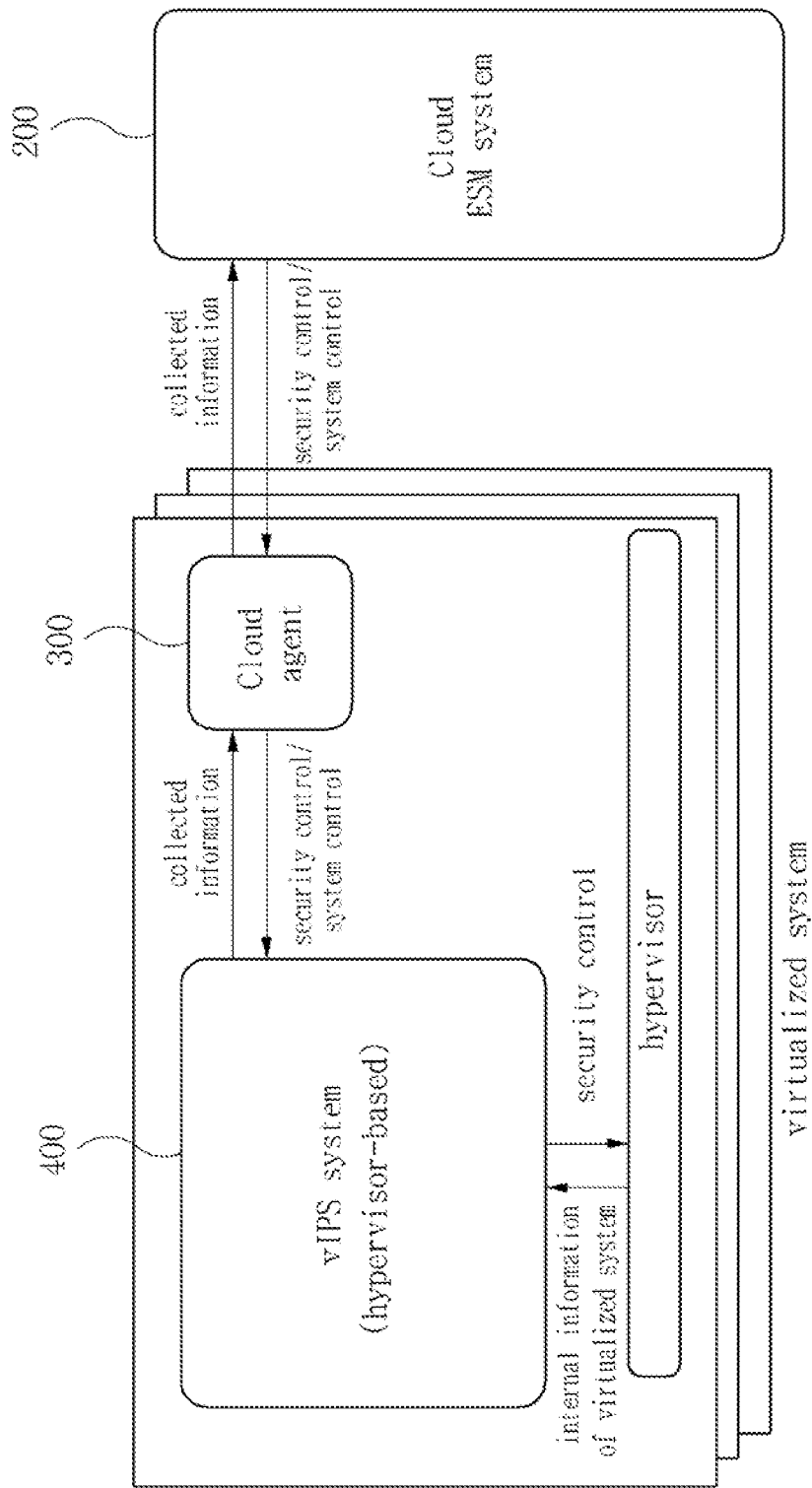
FIG. 2 is a block diagram of the system for controlling the virtual network with the security function according to the preferred embodiment of the present invention.

FIG. 1 is a conceptual diagram showing an operation of a system for controlling a virtual network with a security function according to a preferred embodiment of the present invention, and FIG. 2 is a block diagram of the system for controlling the virtual network with the security function according to the preferred embodiment of the present invention.

As shown in FIGS. 1 and 2, the virtual network controlling system 100 according to the preferred embodiment of the present invention includes a cloud ESM (Enterprise Security Management) system 200 (hereinafter, called 'cloud ESM'), a cloud agent 300, a virtual Intrusion Prevention System 400 (hereinafter, called 'vIPS'), and a virtual switch 500 (hereinafter, called 'vSwitch').

The cloud agent 300 receives security events and resource information generated from the vIPS 400 and transfers the received security events and resource information to the cloud ESM system 200 or applies security policies transferred from the cloud ESM system 200 to the vIPS 400. The cloud agent 300 includes a cloud resource information/security event collecting module and a cloud security control module inside the virtual security appliance (VSA).

The cloud ESM system 200 collects, analyzes and manages information transferred from the cloud agent 300 or transfers security policies to the cloud agent 300, and includes a cloud collection information management module, a cloud security control management module, a potentially malicious virtual machine inspection module, a cloud security event analysis and security state monitoring module, a cloud security policy management and virtual machine zone (VM zone) security management module, and a DBMS. The cloud ESM system 200 is linked with a legacy ESM/SIEM in order to transfer cloud security event and analysis information.

The cloud ESM system 200 collects information and security events of virtualized systems from a number of the vIPSs 400 and carries out integrated security control of the whole cloud infrastructure, and then sends security controls and relevant security policies for coping with intrusion to each vIPS 400. Furthermore, the cloud ESM system 200 controls operation of the vIPS 400 and sends system management commands for managing environmental variables to the vIPS 400.

The cloud collection information management module contracts the virtualization resource information and security events collected from the vIPS 400 and stores and manages them in the DBMS. In this instance, the aggregation and storing of the collected information means definition of DB schema, aggregation and filtering, diffusion storage and search of the collected high-capacity information, conversion for legacy DB linkage, and so on.

The cloud security control management module serves to forcedly migrate the malicious virtual machine in a logical/physical manner, to apply security control against a policy change after recognizing an information change of the virtual machine, and to send and manage security control commands to the vIPS 400 through the cloud agent 300.

The cloud security control management module logically (change of the VM zone) and physically (movement to a specific virtualized system) migrates a target which is detected as a malicious virtual machine. In addition, the cloud security control management module recognizes the live migration of the virtual machine and the change of the VM zone of the virtual machine, and then, promptly applies policies which are changed by the migration and the VM zone change.

The potentially malicious virtual machine inspection module serves to trace and distinguish a potentially malicious virtual machine in relation with the virtualization resource information and security events collected from the vIPS 400.

Trace of the potentially malicious virtual machine means to trace a suspicious virtual machine and to discriminate it as a potentially malicious virtual machine candidate. Discrimination of the potentially malicious virtual machine means to precisely analyze the potentially malicious virtual machine candidate and to judge whether or not it is a malicious virtual machine.

The cloud security event analysis and security state monitoring module serves to analyze a virtualization security state, a change in virtualized resources, attack correlation, and information of virtual network traffic conditions in relation with the virtualized resource information and security events collected from the vIPS 400.

The cloud security policy management and virtual machine zone (VM zone) security management module serves to send and manage the cloud security policies, which will be applied to the vIPS 400, and the VM zone policies for security management of the VM zone to the cloud agent in order to collect information of virtualized resources and detect and cope with virtualized attacks.

The DBMS (DB management system) serves to store input and output information, policy information and analysis results of each of the modules of the cloud ESM system 200.

The vSwitch 500 is an OpenFlow-based software switch existing inside a hypervisor for communication between the virtual machines. The vSwitch 500 blocks intruder's traffics according to blocking rules transferred from the vIPS 400.

The vIPS 400 is a hypervisor-based intrusion prevention platform, and controls an NIPS (Network-based IPS) service, a stateful firewall service, and an HIPS (Host-based IPS) service of a higher level and provides an interface for providing information necessary for carrying out an intrusion detection and an interface which receives detected results. Therefore, the vIPS provides not only the network-based IPS service, the host-based IPS service and the firewall service but also IPS services which can easily substitute and utilize other IPSs or firewalls.

Figure 3:
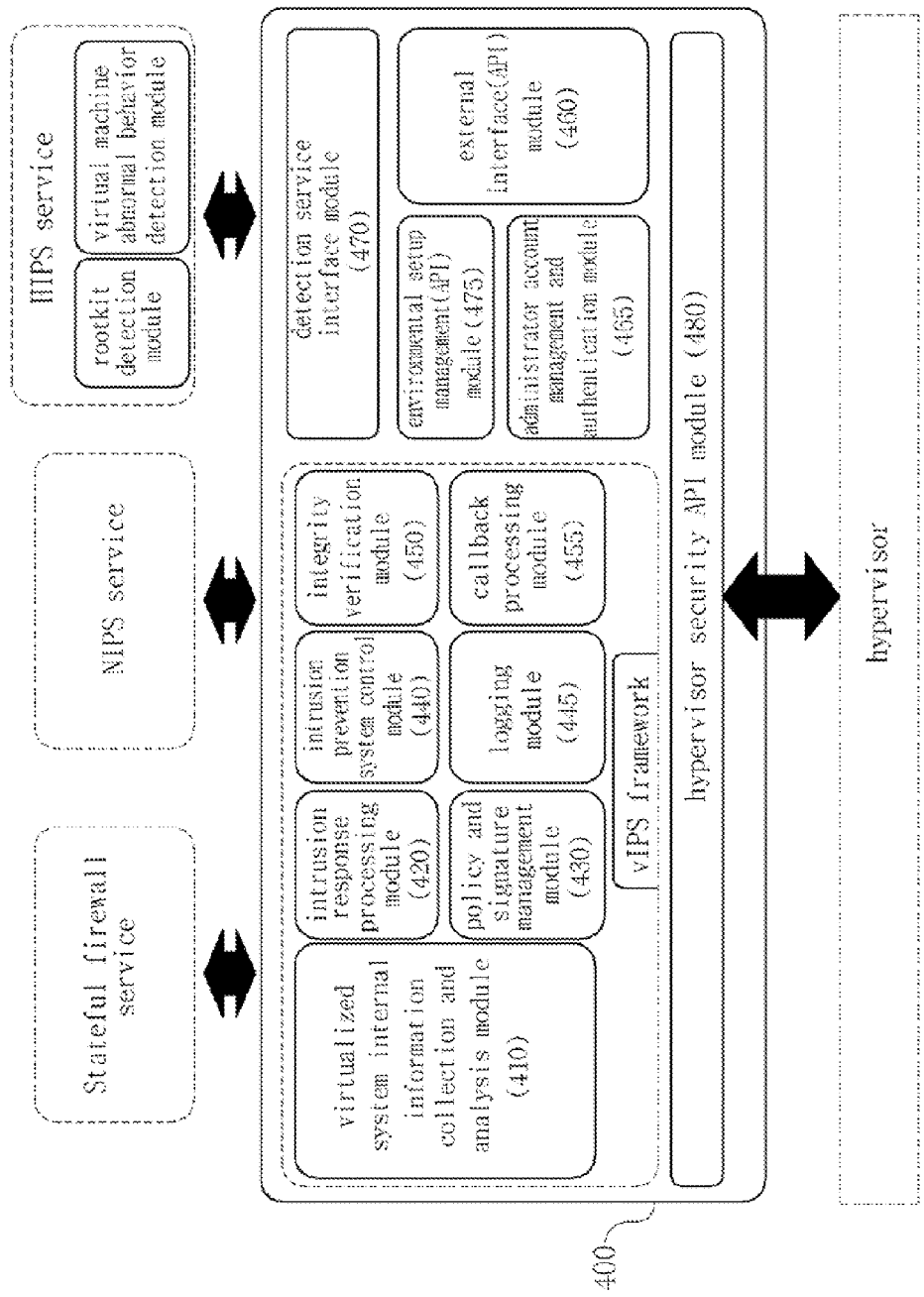
FIG. 3 is a block diagram of a vIPS (virtual Intrusion Prevention System) according to the present invention.

As shown in FIG. 3, the vIPS 400 according to the preferred embodiment of the present invention includes a virtualized system internal information collection and analysis module 410, an intrusion response processing module 420, a policy and signature management module 430, an intrusion prevention system control module 440, a logging module 445, an integrity verification module 450, a callback processing module 455, a detection service interface module 470, an environmental setup management module 475, an administrator account management and authentication module 465, an external interface module 460, and a hypervisor security API module 480.

FIG. 3 is a block diagram of the vIPS according to the present invention.

The virtualized system internal information collection and analysis module 410 acquires internal information of the virtual machine and the hypervisor including network packets of the virtualized system through the hypervisor security API module 480, and provides interpretation of a virtual machine guest OS in connection with the memory contents of the virtual machine.

The intrusion response processing module 420 requests formation of real time blocking rules according to rules of reactions to attacks or blocking response commands. The intrusion response processing module 420 carries out correspondence actions according to correspondence policies in relation with intrusion detection.

The policy and signature management module 430 manages creation, update and deletion of the real time blocking rules. The policy and signature management module 430 manages attack detection signatures, correspondence policies and rules and firewall policies and rules of the NIPS.

The intrusion prevention system control module 440 serves to control the entire operations of the vIPS 400 and to control services for intrusion detection, for instance, the stateful firewall service, the NIPS service, the HIPS service, and so on.

The logging module 445 creates and manages logs.

The integrity verification module 450 serves to verify integrity of the inside of the virtual machine which is designated by the HIPS or the entire or partial data structure of the hypervisor.

The callback processing module 455 provides a callback function to help an effective communication of each module inside the vIPS framework and detection of the intrusion detection service.

The detection service interface module 470 manages external detection services and processes communications between the platform and detection services and between the modules inside the platform.

The environment setup management module 475 manages environment setup values so that the vIPS 400 always runs according to the newest setup value. All modules inside the vIPS 400 access the environment setup values, for instance, reading, writing, and others, through the environment setup management module 475.

The administrator account management and authentication module 465 manages an administrator's account and carries out authentication of the administrator's account.

The external interface module 460 provides an interface for sending and receiving policies of the real time blocking rules. Furthermore, the external interface module 460 provides an interface for system management and security control of the cloud agent 300 and the vIPS 400 of the cloud ESM system 200.

The hypervisor security API module 480 sets up or deletes blocking rules of the vSwitch 500. In this instance, the vSwitch 500 organizes devices corresponding to an open vSwitch in a Xen server which is a virtualization platform.

The hypervisor security API module 480 provides an API which can acquire the internal information of the virtualized system and carry out a security control to cope with the detection by directly accessing the hypervisor. Therefore, the hypervisor security API module 480 provides abstraction of a hypervisor access for a security-related function.

Out of the modules, the virtualized system internal information collection and analysis module 410, the intrusion response processing module 420, the policy and signature management module 430, the intrusion prevention system control module 440, the logging module 445, the integrity verification module 450, and the callback processing module 455 form the vIPS framework.

The vIPS framework is the aggregation of essential common modules to organize the IPS and the firewall which are the core functions in the hypervisor-based virtualized network/host intrusion prevention system, and provides common functions and structures necessary for the NIPS (Network-based IPS) service, the HIPS (Host-based IPS) service and the stateful firewall service of the higher level to carry out access control, detection and response.

The services for carrying out intrusion detection includes the NIPS service, the HIPS service and the stateful firewall service, and carries out detection by receiving input information (virtual network packets, virtual machine/hypervisor internal information, and so on) for intrusion detection and access control using the hypervisor-based intrusion prevention platform and sends the detected result to the platform using the vIPS framework.

The stateful firewall service serves as an engine of a stateful firewall.

The NIPS service serves as an engine of the network-based IPS.

The HIPS service serves as an engine of a host-based IPS, and includes a rootkit detection module and a virtual machine abnormal behavior detection module in a lower level. It is preferable that the lower-level modules of the HIPS service be developed based on signature.

Figure 4:
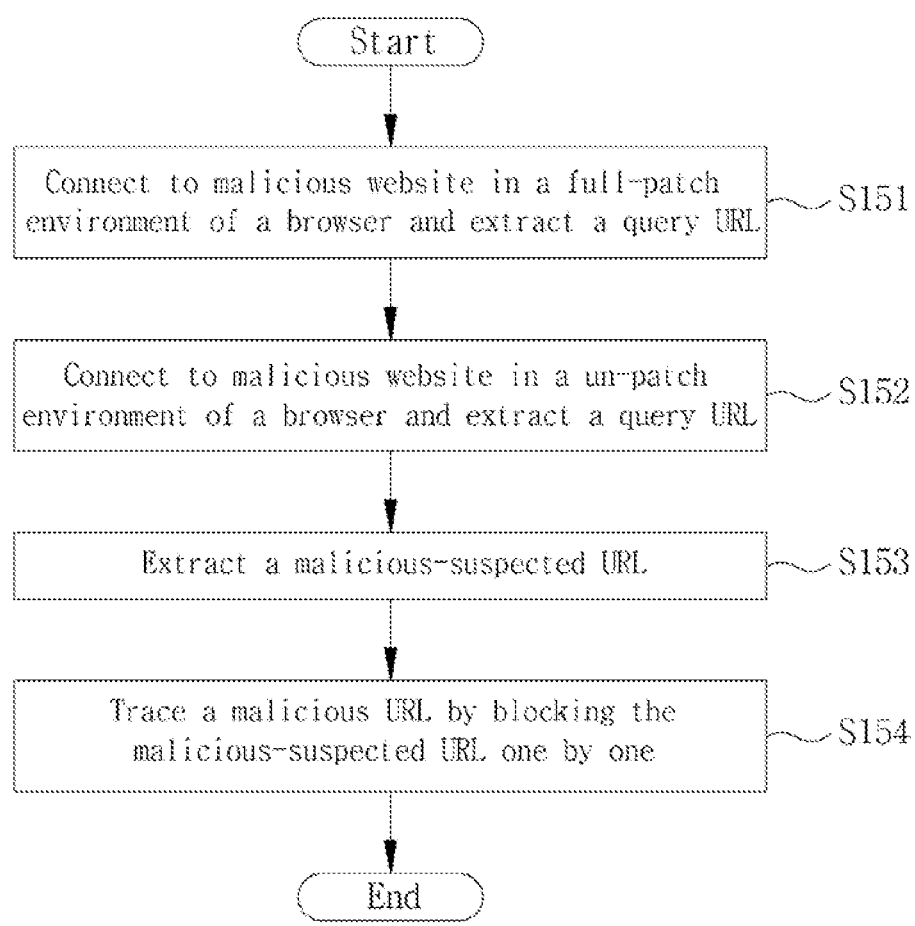
FIG. 4 is a flow chart of a method for controlling a virtual network with a security function according to a first preferred embodiment of the present invention.

FIG. 4 is a flow chart of a method for controlling a virtual network with a security function according to a first preferred embodiment of the present invention.

The hypervisor-based virtual network controlling system 100 with the security function according to the preferred embodiment of the present invention enhances intrusion prevention performance by previously blocking attacking traffics in the network level before an application of a DPI (Deep Packet Inspection).

The vIPS 400 according to the first preferred embodiment of the present invention analyzes and detects malicious behaviors according to signature-based detection and checks an intruder's IP (Internet Protocol). Therefore, this embodiment is independently carried out according to different blocking rules in each vIPS 400 inside the virtual network controlling system 100.

As shown in FIG. 4, first, when any malicious behavior is detected according to the signature-based detection, the vIPS 400 creates real time blocking rules (S10~S20). The vIPS 400 sends the real time blocking rules of a flow rule type to the vSwitch 500 (S30).

Then, the vSwitch 500 blocks the intruder's traffics according to the blocking rules sent from the vIPS 400 in advance (S40). The vSwitch 500 carries out traffic blocking during a designated period of time (hereinafter, called 'blocking time') according to the blocking rules. After that, when the blocking time is lapsed, the vIPS 400 checks whether or not the traffic blocking was carried out actually during the blocking time (S50~S60).

If the traffic blocking was not carried out actually during the blocking time, the vIPS 400 deletes the created blocking rules and terminates the corresponding traffic blocking (S70).

On the contrary, if the traffic blocking was carried out actually during the blocking time, the vIPS 400 extends the blocking time based on the present state to which the blocking rules were applied (S80), and then, the steps (S30 to S60) are repeated.

Figure 5:
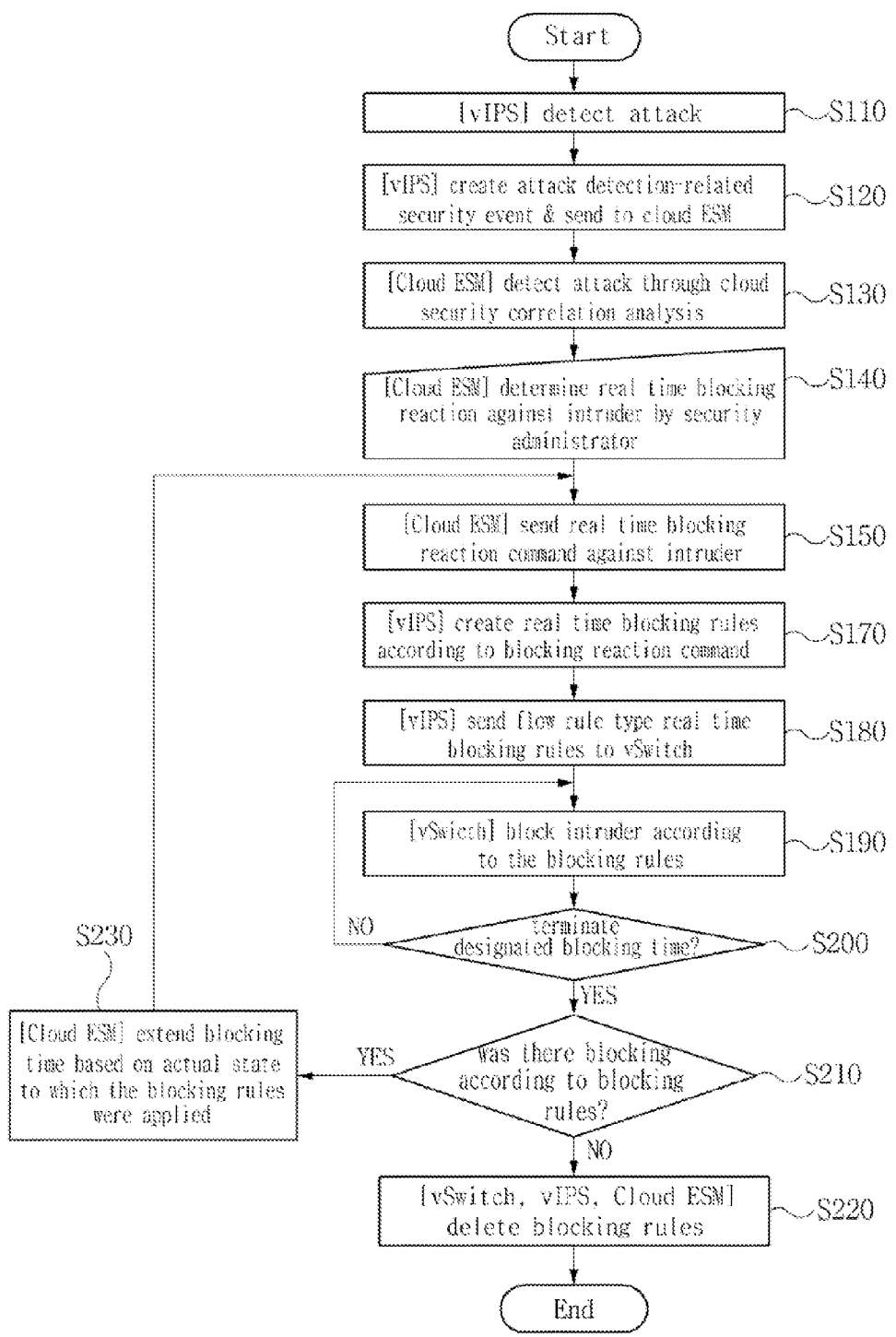
FIG. 5 is a flow chart of a method for controlling a virtual network with a security function according to a second preferred embodiment of the present invention.

FIG. 5 is a flow chart of a method for controlling a virtual network with a security function according to a second preferred embodiment of the present invention.

The vIPS 400 according to the second preferred embodiment of the present invention checks the intruder's IP (Internet Protocol) by carrying out malicious behavior analysis and detection according to correlation analysis procedures of the cloud ESM system 200. Therefore, this embodiment is carried out according to the same blocking rules in all vIPSs 400 inside the virtual network controlling system 100.

As shown in FIG. 5, when a doubtful traffic or attack pattern is detected, the vIPS 400 according to the second preferred embodiment of the present invention creates an attack detection-related security alert (common event format), and sends it to the cloud ESM system 200 (S110~S120).

The cloud ESM system 200 receives the attack detection-related event format from the vIPSs 400 organizing the virtual network controlling system 100.

When the attack detection-related event format is received, the cloud ESM system 200 analyzes the traffic or attack pattern detected in the vIPS 400 through the correlation analysis (S130). Moreover, a security administrator of the system 200 determines a real time blocking reaction (security policy) against the detected traffic or attack, based on the analyzed results (S140). After that, the system 200 sends the determined blocking reaction command to the vIPS 400.

When the blocking reaction command is received from the cloud ESM system 200, the vIPS 400 creates real time blocking rules according to the blocking reaction command (S170). Additionally, the vIPS 400 sends the created real time blocking rules of the flow rule type to the vSwitch 500.

The vSwitch 500 blocks the intruder's traffic according to the blocking rules sent from the vIPS 400. The vSwitch 500 carries out traffic blocking for a predetermined period of time according to the blocking rules like the vSwitch of the first preferred embodiment (S190). After that, when the blocking time is lapsed, the vIPS 400 checks whether or not the traffic blocking was carried out actually during the blocking time (S200~S210).

If the traffic blocking was not carried out actually during the blocking time, the vIPS 400 deletes the created blocking rules and terminates the corresponding traffic blocking (S220).

On the contrary, if the traffic blocking was carried out actually during the blocking time, the vIPS 400 extends the blocking time based on the present state to which the blocking rules were applied (S230), and then, the steps (S150 to S180) are repeated.

Figure 6:
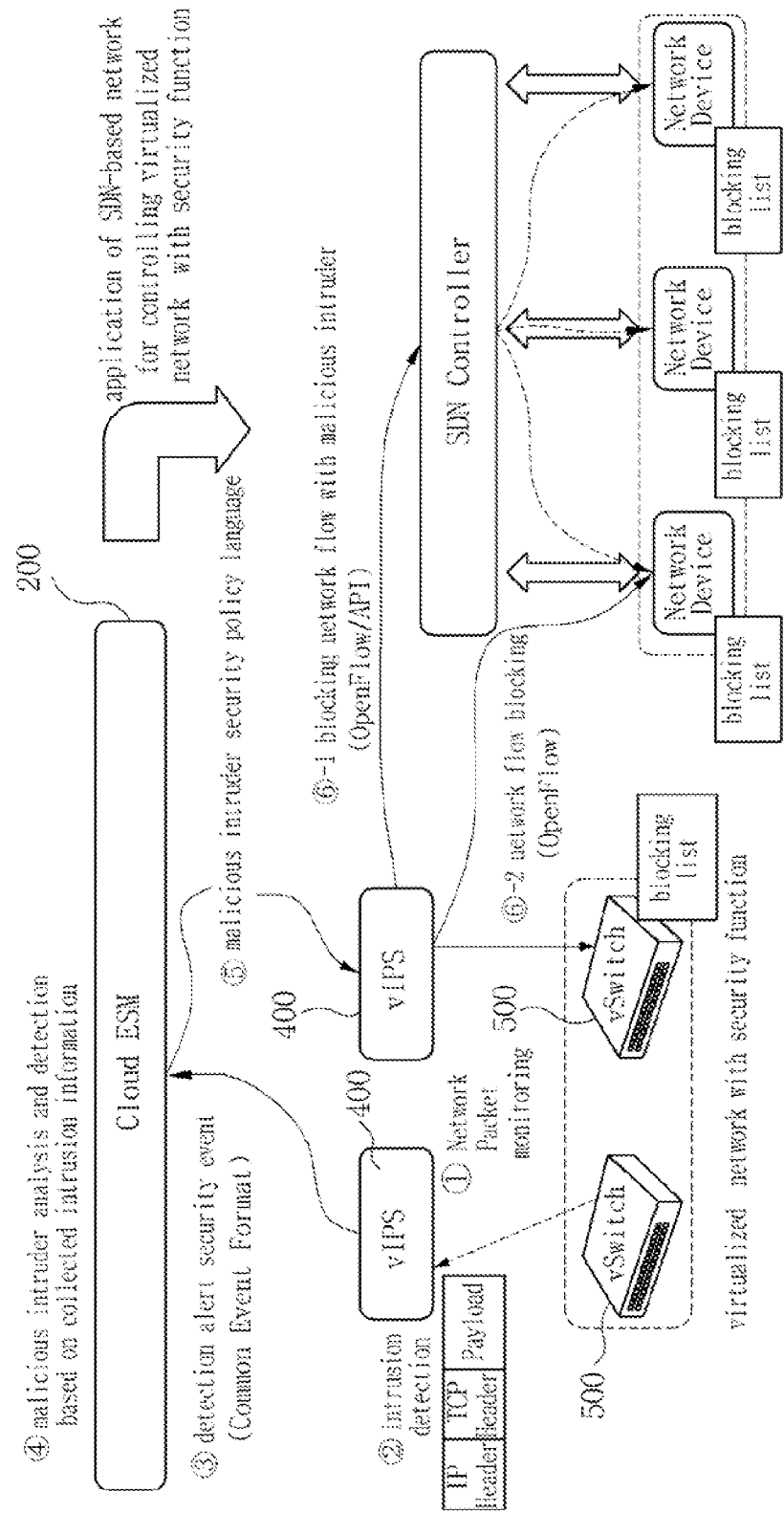
FIG. 6 is an exemplary view of a method for controlling a virtual network with a security function according to a third preferred embodiment of the present invention.

FIG. 6 is an exemplary view of a method for controlling a virtual network with a security function according to a third preferred embodiment of the present invention.

The vIPS 400 according to the third preferred embodiment of the present invention expands security to an SDN (Software-Defined Network) using a network flow control through an open flow.

As shown in FIG. 6, when a doubtful traffic or attack pattern is detected, the vIPS 400 according to the third preferred embodiment of the present invention creates an attack detection-related security alert (common event format), and sends it to the cloud ESM system 200.

The cloud ESM system 200 receives the attack detection-related event format from the vIPSs 400 organizing the virtual network controlling system 100.

When the attack detection-related event format is received, the cloud ESM system 200 analyzes the traffic or attack pattern detected in the vIPS 400 through the correlation analysis. Moreover, a security administrator of the system 200 determines a real time blocking reaction (security policy) against the detected traffic or attack, based on the analyzed results. After that, the system 200 sends the determined blocking reaction command to the vIPS 400.

When the blocking reaction command is received from the cloud ESM system 200, the vIPS 400 creates real time blocking rules according to the blocking reaction command. Additionally, the vIPS 400 sends the created real time blocking rules of the flow rule type to the vSwitch 500. In addition, the vIPS 400 sends the real time blocking rules to an SDN controller (network OS) of an SDN network.

The vIPS 400 according to this embodiment carries out blocking against malicious network traffics even in the SDN by sending the real time blocking rules to the SDN network.

As shown in FIG. 6, in this embodiment, security of the virtual network system 100 with the security function is expanded (linked) to the SDN.

While the present invention has been particularly shown and described with reference to exemplary embodiments thereof, it will be understood by those of ordinary skill in the art that various changes and modifications may be made therein without departing from the technical idea and scope of the present invention and all or some of the exemplary embodiment described in the present invention can be selectively combined. Therefore, it will be also understood by those of ordinary skill in the art that the technical and protective scope of the present invention is defined by the technical idea and scope of the claims of the present invention.

The system and method for controlling the virtual network with the security function according to the present invention reduce the number of packets to which the IPS carries out the signature matching inspection through the DPI test by diffusing blocking against the previously detected intruder by the network level, so as to enhance performance of the virtualized network IPS.

The vIPS 400 according to the first preferred embodiment of the present invention shares intruder information detected in the single virtualized system. That is, the vIPS 400 sends the intruder information detected in the single virtualized system to vIPSs running in another virtualized system so as to provide an early response or blocking to harmful traffics.

The vIPS 400 according to the second preferred embodiment of the present invention can provide an early response against the detected intruder through the cloud security correlation analysis.

That is, the vIPS 400 sends the intruder information detected through the correlation analysis of the cloud ESM system 200 to other vIPSs and makes the vIPSs block the detected intruder in the vSwitch level, such that the vIPS 40 can previously cope with or block attacks or harmful traffics which are difficult to detect in the single vIPS level.

What is claimed is:

1. A method for controlling a virtual network with a security function comprising the steps of:
    receiving an attack detection-related security alert (expressed in a common event format) from vIPSs in a virtual network controlling system including a cloud ESM (Enterprise Security Management) system;
    analyzing traffic or an attack pattern detected in the vIPS through a correlation analysis by the cloud ESM system when the attack detection-related security alert is received;
    determining a real time blocking reaction against the detected traffic or attack in the cloud ESM system on the basis of the analyzed results and sending the blocking reaction command to the vIPS;
    creating real time blocking rules by the vIPS according to the blocking reaction command;
    sending the real time blocking rules to the vSwitch and blocking the intruder's attacking traffic by the vSwitch according to the received blocking rules;
    checking whether or traffic blocking was actually carried out during a blocking time when the blocking time is lapsed according to the blocking rules;
    deleting the created blocking rules and terminating the corresponding traffic blocking by the vIPS if the traffic blocking was not carried out actually during the blocking time; and
    extending the blocking time based on the present state to which the blocking rules were applied and terminating blocking of the corresponding traffic by the vIPS if the traffic blocking was carried out actually during the blocking time,
    wherein the cloud ESM system comprises:
    a cloud collection information management module which stores and manages virtualization resource information and security events collected in the vIPS;
    a cloud security event analysis and security state monitoring module which carries out attack correlation analysis in reference to information received from the vIPS; and
    a cloud security control management module which forcedly migrates the malicious virtual machine in a logical/physical manner, recognizes a change in information of the virtual machine, and sends a security control command according to a policy change to the vIPS through a cloud agent.

2. The virtual network controlling method according to claim 1, wherein the vIPS comprises:
    an intrusion response processing module which request creation of the real time blocking rules according to the blocking reaction command;
    a policy and signature management module which manages creation, update and deletion of the real time blocking rules;
    an external interface module which provides an interface to send and receive policies of the real time blocking rules; and a hypervisor security API module which sets up or deletes the blocking rules on the vSwitch.

3. The virtual network controlling method according to claim 1, wherein the vIPS sends the created real time blocking rules to an SDN controller so as to expand security of the virtual network system to an SDN network.

\* \* \* \* \*